INVENTOR.
BANESH HOFFMANN
BY
Kenyon & Kenyon
ATTORNEYS

TYPICAL WORDS ILLUSTRATING EACH SYMBOL SHOWN IN FIG. 1

| | |
|---|---|
| a | hat |
| a | way |
| a | easy |
| a | pa, harm |
| a | image |
| a | what |
| a | all |
| a | any, dare |
| b | by |
| b | debt |
| c | mice |
| c | cat |
| d | indeed |
| d | judge |
| e | met |
| e | he |
| e | have |
| e | dusted |
| f | for |
| f | of |
| g | gem |
| g | begin |
| g | beginning |
| h | hate |
| h | than, with |
| h | while, honor |
| i | lick |
| i | like |
| i | receive |
| j | just |
| k | kiss, trick |
| k | knife |
| l | spelling |
| m | game |
| n | nine |
| n | ink, ring |
| o | not |
| o | no |
| o | through |
| o | fort, ought |
| o | none |
| o | who, soon |
| o | wood |
| o | women |
| p | up |
| p | pneumatic (OR) pneumatic |
| q | queen |
| r | reading |
| s | yes |
| s | his |
| t | tap |
| t | then |
| u | fuss |
| u | ruse |
| u | put |
| u | ought |
| u | busy |
| u | fuse |
| v | motive |
| w | we |
| w | whole |
| x | extra |
| x | exaggerate |
| y | fully |
| y | yet |
| y | say |
| y | system |
| y | my |
| z | zoo |

Fig. 2.

INVENTOR
BANESH HOFFMANN
BY Kenyon & Kenyon
ATTORNEYS

ILLUSTRATIVE USES OF DIACRITICAL MARKS

INVENTOR.
BANESH HOFFMANN
BY Kenyon & Kenyon
ATTORNEYS

ILLUSTRATIVE EXAMPLES OF PARTICULAR WORDS tear, tear, terrify though, through, thought, rough, bough, caught, cough love, move, cove say, says, eye, look, soon, poor they, pay, eight minute, minute woman, women, man, men ferry, fairy, fare, for, four, fore

Fig. 4.

INVENTOR.
BANESH HOFFMANN
BY
Kenyon & Kenyon
ATTORNEYS

United States Patent Office 3,426,451
Patented Feb. 11, 1969

3,426,451
PHONIC ALPHABET

Banesh Hoffmann, New York, N.Y.
(43—17 169th St., Flushing, N.Y. 11358)

Filed Aug. 9, 1966, Ser. No. 571,261
U.S. Cl. 35—35 15 Claims
Int. Cl. G09b 17/00

ABSTRACT OF THE DISCLOSURE

A font of alphabetical letters are disclosed herein which may be employed for the teaching of spelling and reading. The font is characterized by the fact that each letter of the font has the shape of the standard letter of the alpabet to which it corresponds but has a shading, density or other typographical characteristic to suggest its pronunciation in the word in which it is used. Accordingly, the alphabet disclosed may be used to print words for the beginning reader in a fashion that retains the correct spelling yet appropriately indicates or suggests the manner in which the letter is pronounced in the word involved. The alphabet or font also includes an underline and a dot denotation to suggest and indicate those pronunciation characteristics which cannot be handled solely by the typography associated with individual letters. For example, the underline is used to indicate dual letter pronunciations such as diphthongs and digraphs.

This invention relates in general to a phonic alphabet and more particularly to an alphabet adapted to be employed for educational purposes such as in the initial teaching of reading.

There are many phonic systems which have been developed in order to indicate the manner in which written words are to be pronounced when spoken. These systems generally involve a very extensive change in the spelling of the words involved. In addition, most such systems employ a very extensive set of diacritical marks. Systems that change the spelling have very real limitations in the teaching of reading to young children. The distortion of the spelling of words fails to prepare the student for the printed page with which he must ultimately be faced. In addition, the use of a complex or extensive set of diacritical marks draws attention away from the words involved and, indeed, learning the meanings of these diacritical marks is more difficult than learning to read in the first place without such aids.

In general, the known systems for suggesting the pronunciation of a word by the manner in which it is printed are apt to introduce too many complications for effective use in teaching young children how to read. The English language, in particular, has such a range of pronunciations that are reflected in divergent spellings as to make any attempt to provide a phonic alphabet appear hopeless without altering the spelling. It must be kept in mind that not only is it common for a given letter or combination of letters to be pronounced in different ways when employed in different words but it is also common for the same sound to be spelled in different ways in different words. As just one example, the two letters "gh" are frequently sounded like an "f" as in the words "rough" and "enough," whereas in other words the two letters "gh" are not pronounced at all, as in "though," "caught," and "eight." As an example of the second situation mentioned above, there are the homonyms "their" and "there" as well as the common sound between the words "air" and "fare." When one considers that the non-standardized relationship between spelling and pronunciation is reflected in a vast number of the most commonly used words in the English language, it becomes apparent that one can not have recourse to such expedients as selecting the more phonetically spelled words for the purpose of teaching reading to children.

Accordingly, it is a major purpose of this invention to provide a phonic alphabet that is particularly adapted to teaching young children how to read.

It it a further important purpose of this invention to provide a phonic alphabet which retains the spelling of each word.

It is a further important purpose of this invention to provide a phonic alphabet in which the use of diacritical marks is reduced to a minimum.

In achieving the above purposes of this invention it is a correlated purpose of this invention to provide a technique for teaching reading to children that will enable the child to transfer easily and readily what he has learned to the reading of the ordinary printed page.

It might be kept in mind that in achieving the objects of this invention, a phonic alphabet is provided which makes a compromise between precision and simplicity. In order to avoid a cumbersome alphabet, the system of this invention sacrifices some measure of precision in order to achieve a limited number of distinct characters and a minimum of diacritical marks.

There are certain standard indicators of syllabification and stress which may or may not be employed in teaching reading to young childern. I have found that almost all other pronunciation problems faced by the beginning reader can be dealt with by use of a special alphabet wherein all of the letters have the outline of one or another of the 26 letters of the alphabet and wherein only two diacritical marks are employed.

It is a more specific purpose of this invention to provide a phonic alphabet in which each of the letters employed looks sufficiently like the corresponding letter in regular type as to be immediately recognizable to the reader and, specifically so that each letter in the phonic alphabet has an outline identical to that of the letter used in the normal spelling of whatever word is involved.

Yet, more specifically, it is an important purpose of this invention to provide a phonic alphabet that serves the above purposes with a font of letters such that all of the letters corresponding to any one of the regular letters of the alphabet are substantially identical in their outline form. For example, there are eight pronunciations of the letter "o" and thus there are eight characters in the font of letters representing the letter "o." It is a purpose of this invention that all eight of these letters have the same outline or shape.

It is a further specific purpose of this invention to provide a phonic alphabet in which the number of diacritical marks employed is minimized and wherein the diacritical marks are relegated to a position beneath the letters involved so as not to affect or detract from the important upper profile of the letter, the outline of the letter thereby being left as the dominant characteristic.

In brief, the phonic alphabet of this invention, in one embodiment, employs some 69 distinct letters. Each of these letters corresponds to one of the 26 regular letters of the alphabet. Each letter bears an outline that is the same as the outline of the corresponding one of the 26 regular letters of the alphabet. Accordingly, within each group of letters that corresponds to any one of the 26 letters, all of the letters within that group have the same outline. In addition to the 26 regular letters, there are:

(1) Fourteen heavily printed letters to indicate a strongly sounded letter as is the letter "a" in "way" as contrasted with the less strongly sounded "a" in "hat."

(2) Thirteen letters which are printed entirely in dotted form to indicate that they are unsounded as is the letter "a" in "easy" or the letter "k" in "knife."

(3) Five vowels in which a portion of the vowel is dotted and another portion is solid, the solid portion being such as to indicate the letter "i." These vowel symbols are to indicate that the vowel is sounded in a fashion very similar to an unstressed "i," such as is the "a" in "image" and the "e" in "dusted."

(4) Three "hollow" looking vowels to indicate a hollow sound such as accompanies the "a" in words like "pa" and "harm."

(5) A half dozen or so other vowel variations, mostly involving "a" and "o," which are described in detail in connection with the description of the figures.

In addition to the 69 letters, two diacritical marks are employed. One is a dot that is placed directly below a letter, usually a vowel (and in many cases between and below two letters), to indicate the "schwa" or nondescript sound. Examples include the "a" in "aloft," the "e" in "the," the "i" in "first," the "o" in "worse" and the "u" in "curl." Examples where the nondescript "schwa" sound is carried between two letters, and thus is indicated by a dot placed between (as well as below) the appropriate letters, are the words "acre" where the dot would be placed between and below the "c" and the "r"; "prism" where the schwa dot would be placed between and below the "s" and the "m"; and "fire" where the schwa dot would be placed between and below the "i" and the "r." This nondescript sound is very common. As a first approximation, all five of the vowels sound approximately the same when given a "schwa" sound.

The second diacritical mark employed is an underline. This underline is normally used to join two adjacent letters to indicate those pairs (usually digraphs and diphthongs) that can not be sounded out and thus require some indication of their arbitrary pronunciation. The "th" in "the" is one such example. The underline in general is an indication of an arbitrary sound and is employed in rare instances under individual letters as well as under entire words as will be described in greater detail further on.

Other objects and purposes of this invention will become apparent from a consideration of the following detailed description in connection with the drawings in which:

FIG. 2 is a listing of words illustrating at least one use of each of the letters illustrated in FIG. 1;

FIG. 3A showing the use of the "schwa" dot and FIG. 3B showing the use of the underline; and FIG. 4 illustrates various groups of words wherein the words in each group have an instructive relationship to one another.

Figure 1:
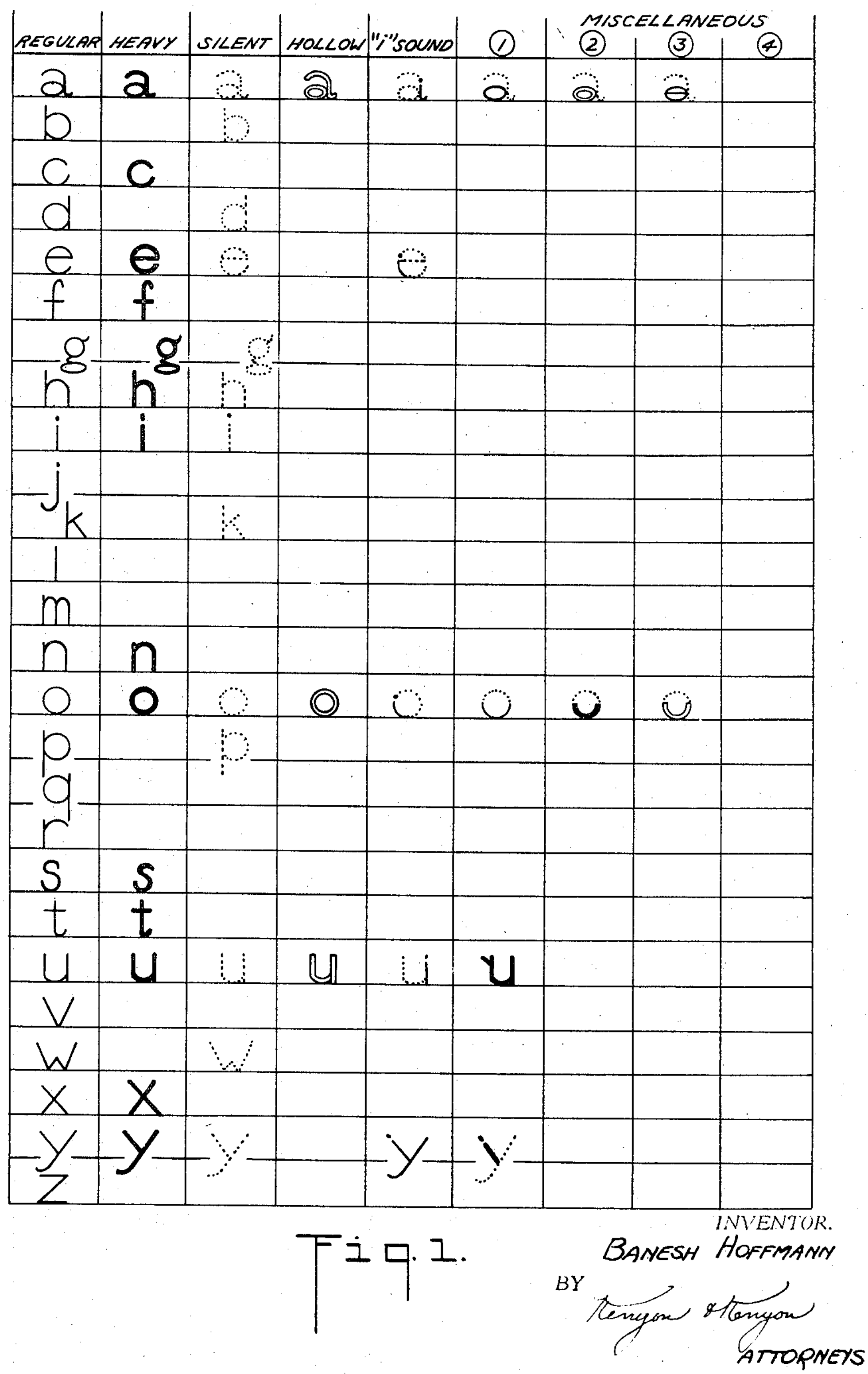
FIG. 1 is a table of one substantially complete font of letters illustrating an embodiment of this invention.

FIGS. 1 and 2 are best considered together. FIG. 1 is a chart of 69 letters that constitute one embodiment of this invention and FIG. 2 is a list of at least one example representing each of the 69 letters of FIG. 1. By the use of the font of letters shown in FIG. 1, it becomes possible to show the pronunciation of the vast majority of English words while retaining both the regular spellings of the words and also the regular shapes of the letters employed in spelling the words. By retaining the shapes of the letters employed in spelling the words, it becomes possible to achieve the very important teaching goal of retaining the shapes of the entire words. The 69 letters in FIG. 1 have sufficient diversity to show the pronunciation of almost all commonly used English words.

With regard to the alphabet shown in FIGS. 1 and 2, it should be recognized that the alphabet of this invention has an inner logic that makes its sounds easy to remember. In particular:

(a) It employs heavy type for heavy sounds.

(b) It employs regular type for the regular or lighter sounds.

(c) It employs hollow type for hollow sounds.

(d) It employs dotted (or shaded) type for unsounded letters.

(e) It employs partially dotted, partially solid type to show the pronunciation of vowels which basically sound like other vowels.

An examination of FIG. 1 will show that all of the letters corresponding to any one of the regular letters have the same shape as the regular letter. Thus once a beginning reader has learned to recognize a given shape for the letter "a," he can readily see that all eight of the variations in the letter "a" are the letter "a." Thus he does not have to learn to associate different types of typography with different sounds. It is conceivable that one would consider printing the heavy sound for an "a" as a capital "a" and the regular sound as a small "a." The disadvantage in such an approach is that it makes the transfer to a regular typographical setup more difficult. Futhermore, the shape of each letter is not obscured or distorted by the use of diacritical marks intimately associated with the letter.

Perhaps most importantly, this invention employs a typographical indicator of pronunciation that is consistently followed in that there is a minimum of unique and arbitrary indicators.

Because spelling and shape are unchanged, the alphabet of this invention encourages both correct spelling and the recognition of whole words. The pupil is not taught that a given undifferentiated "a" carries such diverse sounds as in the words "cat," "wall" and "father." Yet he does learn that each of these different sounds is represented, in spelling, by an "a." The weaning process from the alphabet of this invention to regular typography should be much easier than with other known alphabets.

One of the more important and useful aspects of this invention is the various partially dotted vowels employed. The partial dotting of the vowel symbols makes it possible to give a unique identification for each vowel sound while continuing to indicate which vowel is employed in the spelling of the word involved. It is the vowels that cause the gravest problem in devising a phonic alphabet to meet the objects stated above since it is the vowels which have the greatest variability in the way they are sounded.

It should be recognized that the employment of this partially dotted technique is an extension of the technique of dotting the entire letter where the letter is completely unsounded. The partial dotting of each vowel is arranged in such a fashion as to leave the undotted portion in the form of some other vowel, which other vowel has the required pronunciation. For example, the "a" in "image" sounds like an "i" and thus, as may be seen in FIG. 2, the "a" is partially dotted so that the undotted portion resembles an "i." Similarly, the "a" in "what" sounds like a regular "o" and the "a" is partially dotted so that the undotted portion looks like an "o." Again, the "a" in "all" sounds like a hollow "o" and the appropriate modification of the "a" is made to show the hollow "o." Indeed, the "a" in words such as "any" which sounds like an "e" is shown like an "e" with a dotted tail and dotted head to indicate that the spelling involves an "a" even though pronounced like an "e."

Thus there is a single unifying principle that what the reader sees as dotted is unsounded and it is the undotted portion of the letter which carries the pronunciation of the letter.

In printing especially where a large type face is employed, the dotted letters and portions of letters may have a large number of very tiny dots so as to present a grey aspect rather than a single series of dots. The term "dotted type" herein shall be understood to include all forms of shaded type face.

The font of 69 letters illustrated in FIG. 1 is not exhaustive. For example, a dotted "m" might be employed for words such as "mnemonic." However, such words are unlikely to be employed in teaching young children how to read and thus FIG. 1 has been limited to a font of letters that covers the words likely to be used in beginning reading. It is also possible that certain of the letters in the font shown in FIG. 1 could be eliminated. For example, the heavy "x" for words such as "exaggerate" may not be necessary in most situations.

Furthermore, there are other variations which might be employed in order to simplify matters or to permit a wider range of words to be printed in the system of this invention. A heavy "w" might be employed to suggest the "u" sound, which sound is part of the name "double-u" of the letter "w." This "u" sound is found in words like "threw" and "few." The heavy "w" might even be used in words like "allow" and "cow." Although by no means a perfect representation of the pronunciation of the "w" in these words, the use of a heavy "w" permits eliminating the underline in such letter pairs as "ow" and "ew."

It is anticipated that in a preferred embodiment of this invention, the material presented to the student will be duplicated on facing pages, one of the pages being in regular type and one of the pages being in the type form of this invention. In this fashion students will be able to make the transition to regular type at their own pace and as soon as they are ready to do so, and the phonic page will serve as a valuable prop and encouragement during this self-weaning process.

The alphabet of this invention does not attempt to conceal the fact that English spelling is a hodgepodge. It faces up to that fact and draws a student's special attention to just those words that have outlandish spelling. It thus provides a sound foundation for the learning of reading and spelling in the long run.

In the embodiment illustrated, there are only two deviations from the strict rule that there will be no changes in the shape of the letter involved. Both of these deviations are minor. One is the use of the "u" with a preliminary hook on it to represent the sound of the "u" in a word such as "fuse" (see FIG. 2) as contrasted with the sound of the "u" in a word such as "ruse" (see FIG. 2). The position and shape of the hook is such that it serves to simulate the initial "y" sound that leads into the "u" sound in these words. By simulating the "y" and suggesting the sound, this particular deviation does not burden the student with any significant additional memorization. However, by its shape it should be noted that this small hook in front of the "u" does not cause the letter to look like any other letter and, indeed, it is quite clear that a "u" is intended.

The second deviation has to do with the partially dotted "a" in words such as "any" and "dare" (see FIG. 2). In order to show that the pronunciation of the "a" in these words is very similar to the regular "e" sound, a small line is inserted in the lower body of the "a" so that the undotted portion simulates an "e." Again, as with the hook in the "u," this minor deviation of a line in the body of the "a" causes the letter "e" to be simulated to suggest the "e" sound. Thus, as with the hook in the "u," the student is not burdened with significant additional memorization.

These two minor deviations from the rule against letter-shape deviations are limited in such a fashion as to stay within the general rule that the letters must be recognizable as the letters that are employed in the spelling of the word. One of the real advantages of the system of this invention is that it makes such deviations so few in number, and self-explanatory, that they can readily be accommodated without disturbing the over-all impact of the system.

When a letter is doubled, as is the "t" in "letter," both letters of the pair are printed in the same way. The sound of either one of the letters carries the sound of the pair. There are a number of double letter illustrations in FIG. 2, such as the words "indeed," "beginning," "spelling," "soon" and "wood." The words "soon" and "wood" are of particular interest. They are shown in FIG. 2 to illustrate the "o" having a heavy "u" sound and the "o" having a hollow "u" sound respectively. They emphasize the rule that the letters in a double letter pair are printed in the same way.

Certain letter combinations, for example the hard "c" followed by a "k," are such that either letter can carry the pronunciation. In that case, rather than show one of the letters as dotted and thus unsound, it is preferable to print both letters as sounded since either can be considered as carrying the sound. Thus in the words "trick" and "lick" the "c" is printed as a heavy "c" and the "k" is printed as a regular "k."

It may be noted that the set of letters and thus the number of type pieces required in order to print books in the system of this invention is greater than is employed or required under other known systems. The reason for this is that the same sound when spelled differently will be printed differently since the spelling is unaltered under the system of this invention. For example, the "o" in the word "none" is sounded like the typical "u" but is printed in the system of this invention (see FIG. 2) to look like an "o." It is printed with its lower half solid and its upper half dotted so that the solid portion simulates a "u" and the upper portion in conjunction with the bottom portion shows the reader that the spelling involves an "o." The dotted portion being "silent" permits the reader to read the letter directly and without specific instructions for this case as having a "u" pronunciation. Obviously, this fundamental approach which requires that each word be spelled correctly and within that framework imposes variations on the way in which the letters look (though keeping each letter recognizable), is going to proliferate the number of separate symbols required. However, this increase in the number of symbols is required in order to incorporate a distinct symbol for each sound yet retain the proper spelling of each word. In effect, there are many cases where more than one symbol is used for the same sound. However, this is desirable since such is in fact the situation in English spelling and the purpose of the system is to teach habits which can be readily transferred from the special system to regular typography while assisting the learning of correct spelling.

Figures 3A, 3B:
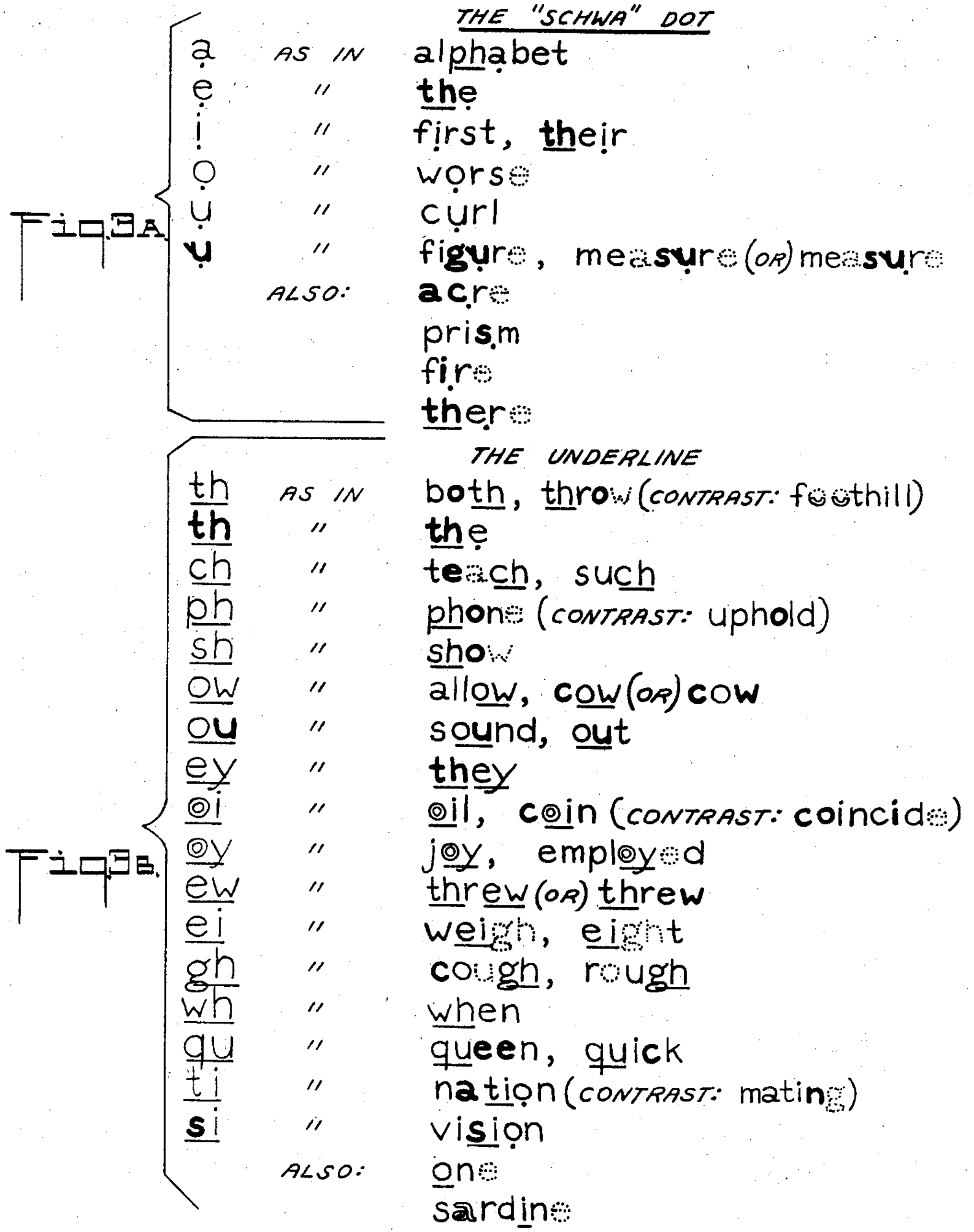
FIGS. 3A and 3B illustrate the use of diacritical marks.

By use of the alphabet of this invention, only two diacritical marks need be used. These two diacritical marks, both shown in illustrative examples in FIGS. 3A and 3B, are the schwa dot indicating the nondescript schwa sound, and the underline which, among other things, ties together certain diphthong and digraph pairs. One of the important features of the system of this invention is that both of these diacritical marks are employed beneath the letters involved so that the upper profile of the letters is in no sense marred, nor is the upper profile of the letters detracted from by the use of accent or diacritical marks placed above or to the sides of the letters.

As may be seen in FIG. 3A, all the vowels with the nondescript schwa sound, such as the "e" in "her" and "the," are printed in regular type with the dot underneath, with the exception of the "u" in words such as "figure." The "u" having a hook such as the "u" in "fuse" (see FIG. 2) and in "figure" (see FIG. 3A) is always shown in heavy type even when illustrating the nondescript schwa sound. It might be noted that in England, the word "figure" is pronounced differently than in the United States and the "u" would be printed as a regular "u" with a schwa dot directly underneath it.

The schwa dot is also placed between (and preferably below) a vowel and a succeeding consonant (usually an "r") when a vowel is not present to carry the schwa dot. It is also used between consonants to indicate the presence of the nondescript schwa sound. This use of the schwa dot between letters (and preferably positioned so that it is also below the line of letters) is important in words such as "acre," "prism" and "fire" (see FIG. 3A).

Digraphs and diphthongs that have arbitrary sounds are underlined as in the "th" in "both" and "throw" (see FIG. 3B). Where the digraphs or dipththongs can be sounded out, they are not underlined. Thus there is no underlining in words such as "stop" and "strop." There is no need to consider the underlining mark as having any necessary relation to digraphs and diphthongs. The underline is employed as a warning sign to indicate an arbitrary sound that can not be sounded out accurately. This underline mark can be used for any letter or letter combination (including more than two letters) having a highly arbitrary sound.

If the spelling is to be preserved, some indication of arbitrary sounds must be employed. In the word "telephone" the pair "ph" is employed for an "f" sound. Such arbitrariness requires some warning symbol. In general, the underline is employed as the warning symbol. There are occasional cases where an individual letter will require a line under it to indicate an unusual pronunciation. For example, the "o" in "one" and the "i" in "sardine" have an unusual pronunciation, for the letter involved. This arbitrary pronunciation is best indicated by an underline which simply draws attention to this fact. It is very rare for an "o" to sound like a "w" or an "i" to sound like an "e" and it does not seem warranted to devise any special indication for these pronunciations.

It is generally preferable to avoid using the underline where possible. For example, the "wh" in "when" can be indicated by an underline though as a reasonable approximation "when" could be printed with a dotted "h" and no underline. The introduction of a heavy "w" (discussed above) for the "double u" sound would allow omitting the underline under the letter pairs "ow" and "ew" in words such as "few," "threw," "allow" and "cow." In such cases the alternate spellings shown in FIG. 3B would be employed.

The "ar" in words such as "are," "hard" and "farm" would be underlined if it were not for the use of the "hollow a" symbol. In keeping with the preference for a minimum use of the underline, I prefer the use of the "hollow a."

Experience in the use of this invention may show that the beginning reader can adequately sound out the "oi" or "ou" pairs in words such as "oil," "coin," "out" and "sound." Only extensive experience can tell whether or not these and other pairs can be adequately sounded out without the use of the underline indicator.

There are certain remedial reading situations where this invention may have considerable value. One type of remedial reading situation is that where the student is older, frequently an adult, and has a considerable vocabulary. Indeed, in such cases he is quite sophisticated and knowledgeable. To start such an individual on a reading program that is employed with first grade children too often leads to boredom and an unwillingness to continue. By use of the alphabet of this invention, it becomes possible to prepare sophisticated textual material for such people and thus retain their interest in what they are reading while they learn to read. This more sophisticated textual material will frequently include words of foreign extraction or words having an esoteric spelling. In such cases, the entire word or syllable of a word may be underlined as an indication of the fact that the word has a highly non-phonetic and non-standardized type of pronunciation. This is another example of the generalized use of the "underline" diacritical mark to bring attention to a pronunciation problem or situation that otherwise is not covered by means of this invention.

It would, of course, be possible to employ a larger number of diacritical marks and dispense with the various type faces that constitute this invention. However, with vowels like "a" and "o" having so many possible pronunciations, a system of diacritical marks would be cumbersome as well as arbitrary unless one were ready to change the spelling of the words. But, the whole point of this present invention is to preserve the spelling of the words. Furthermore, diacritical marks above the letters would alter the upper profiles of words and make it more difficult for the student to switch to regular face type. If a large number of different diacritical marks were placed below the words, then the student's attention would be drawn to the wrong place. In any case, so extensive a use of diacritical marks would generate a system that would not particularly aid in the teaching of reading and would impose as many difficulties as it would solve, The alphabet of this invention seeks to focus attention, as far as possible, where it best belongs, namely on the body and the over-all shape of the letters and words as well as on the spelling of the words.

Because the diacritical marks employed in this invention are few in number and are applied beneath the word, they do not get in the way of the usual indications of stress and syllabification. Textual material can therefore incorporate many of the presently used aids to pronunciation, such as hyphens and accent marks.

The system described and the set of letters available for use as provided by this system can not possibly cover every sound which a spoken language may employ. In particular, there are foreign words which are incorporated into common use and thus become a part of the English language which can not readily be represented by this system without increasing the complexity of the system considerably. The purpose of this system, however, is primarily to teach reading and it is a tool to facilitate the ultimate transition into the reading of ordinary print. By the time esoteric and foreign words are introduced into the student's reading vocabulary, the transition will normally have been made so that the system of this invention need no longer be employed as a teaching device for the post-transition student. Accordingly, the system of this invention is designed to be a practical system to cover almost all, if not all, of the words that will be employed during the initial stages of teaching the reading of the English language.

But, it should be understood that the general system of this invention could be expanded to include all sorts of esoteric and unusual sounds, while retaining the spelling, but that such expansion is highly unlikely to be warranted or required in most applications for the system. After all, this system is intended to teach reading and, as a general rule, the individuals to whom reading is to be taught will be taught from a somewhat limited vocabulary.

Furthermore, there are situations where an approximation to certain types of sounds is sufficient for the purpose. For example, the "zh" sound in words like "measure" (see FIG. 3A) and "vision" (see FIG. 3B) is only approximated in the embodiment illustrated. As a practical teaching matter, it is preferable to approximate under such circumstances than proliferate symbols that are rarely used. After all, the device which is this invention is in a sense but a dummy whose only function is to carry a relationship between sounds and spelling. Thus, as a teaching tool, it is essential that the device of this invention not obscure the basic principle being illustrated. So it is that the device of this invention has its elegance in its simplicity rather than in a complexity.

It is a great incentive in learning to read to find that one is able to see generalizations and apply them in the solving of the pronunciation of words having highly non-phonetic spelling. A student who starts to see patterns finds rewards in having solved a problem. However, the perception of patterns and the consequent rewards often do not come until the student has achieved some sophistication in reading. By means of this invention, these kinds of rewards and incentives are brought to the very beginning reader. The alphabet of this invention makes it poshible for him to solve many pronunciation problems at a very early stage because it makes the solution to these problems so much simpler. Furthermore, the technique of this invention thereby generates the right kind of approach to the solving of the problems of the relationship between spelling and pronunciation, which approach can then be carried forward to the time when the student has become sophisticated enough in his reading to dispense with the need for material printed in accordance with the teachings of this invention.

Thus, from one point of view, learning reading by means of this invention has the aspects of a game and the student at a very young age can get the experience and reward of discovery.

Another advantage of the system is that the student can immediately apply what he has learned to signs in store windows, in the school and in other places. Because there is no conflict in the spelling employed by this system and the student's environment, he can reinforce what he has learned as soon as he is able to accommodate to various typographical styles.

A major aspect of this system is that it is largely self-explanatory and thus requires little or no additional memorization on the part of the student. The "code" carried by this system has a minimum of arbitrariness. The student soon learns that most of the symbols suggest their own pronunciation (the underline is the most significant exception). Indeed, the system has the advantage that the sounds of the heavily printed vowels are the same as those of the vowels' names which the student already knows.

FIG. 4 does not illustrate any aspect of this invention which is not illustrated and discussed above. However, a study of FIG. 4 may prove useful in providing an understanding of the subtleties of pronunciation that may be illustrated with this invention. FIG. 4 illustrates how similar pronunciations having divergent spelling are indicated without destroying the proper spelling. It also emphasizes how this system also serves to show the divergent pronunciation of words having the same spelling. With the understanding of this invention that has been developed above, FIG. 4 should be self-explanatory.

A specific embodiment of the invention has been set forth in detail for the purpose of illustrating the invention and enabling those skilled in the art to adapt the invention in whatever way may be necessary to meet the requirements of particular applications. Thus it is not intended that the embodiments shown be exhaustive or necessarily limitative. It is to be understood that various modifications may be made (some of which have been described above) in the embodiment illustrated without departing from the scope of the invention as limited by the prior art.

For example, the embodiment illustrated can be considerably simplified if one is willing to accept certain words as explicit exceptions to the system when teaching reading. For example, if the words "Pa" and "Ma" are treated as exceptions, it is possible (at least in the United States) to eliminate the use of the hollow "a" symbol. With the hollow "a" symbol eliminated, those words such as "hard" and "farm" would be written with an "ar" rather than with the "a" in hollow form. It would also be possible to eliminate the heavy "x" and use only the regular type face "x." Simplifications such as this are a matter of choice and do not cause the system to deviate from the basic system described and claimed herein.

By contrast, however, there may be unique situations where only a very small portion of the font of letters provided by the system will be employed. For example, in teaching a highly phonetic language such as Spanish, it might be desirable (particularly when teaching Spanish to English-speaking older children and adults) to use a very limited number of the special symbols taught by this system.

Furthermore, there may be specialized remedial reading problems which, because they differ from individual to individual, may call for attention to only a relatively few spelling and pronunciation arrangements. Thus the remedial text for individuals with various types of reading deficiencies might be designed to employ only a portion of the total font of letters suggested by this system or different portions for different parts.

However, it should be emphasized that the major purpose of this invention is seen to be in the beginning teaching of reading. It is the one system that combines both the phonetic and the word recognition approach. Teachers can use this system to emphasize either approach or any combination of these two basic approaches to the teaching of reading.

The method of representing words in the alphabet of this invention would not be exactly the same in England as in America because of the difference in accent. Howevert, this alphabet can readily be accommodated to various types of accent. For example, it might prove valuable in some situations to use a heavy "r" along with the "r" in ordinary type.

Accordingly, it is intended to cover all such variations in the following claims.

What is claimed is:

1. A set of letters constituting an alphabet adapted to be employed in the teaching of reading and spelling, said set comprising:

(a) a first subset of letters of a predetermined type face, said first subset containing each of the letters of a standard alphabet, each letter of said first subset to be employed where the regular pronunciation of a letter is involved, (b) a second subset of letters having a type face heavier than said predetermined type face, the letters of said second subset to be employed where the heavier pronunciation of consonants and the longer pronunciation of vowels are involved, (c) a third subset of letters in dotted type face, the letters of said third subset to be employed where unsounded letters are involved, and (d) a fourth subset of letters, each of said letters in said fourth subset having a type face partially dotted and partially in the type face of one of the other of said subsets, the letters of said fourth subset to be employed where the pronunciation of the letters involved may be indicated by means of the undotted portion of the letter, each of the letters in said first, second, third and fourth subsets having substantially the same shape in outline.

2. The set of letters of claim 1 further comprising:

a fifth subset of letters in hollow type, each of the letters of said fifth subset to be employed where the hollow vowel sounds are involved, each of the letters in said fifth subset having substantially the same shape in outline as the corresponding letters in said first subset.

3. The alphabet of claim 1 further characterized by a bar underlining selected ones and selected groups of said letters in whatever text employs said alphabet, said bar to be employed where said letters and letter groups have arbitrary pronunciations.

4. The alphabet of claim 2 further characterized by a bar underlining selected ones and selected groups of said letters in whatever text employs said alphabet, said bar to be employed where said letters and letter groups have arbitrary pronunciations.

5. The alphabet of claim 3 further characterized by a dot positioned below selected letters in whatever text employs said alphabet, said dot to be employed to indicate the nondescript schwa sound.

6. The alphabet of claim 4 further characterized by a dot positioned below selected letters in whatever text employs said alphabet, said dot to be employed to indicate the nondescript schwa sound.

7. Educational material for use in teaching and learning reading and spelling including a printed text of words, the letters of which comprise:

(a) a first subset of letters of a predetermined type face, said first subset containing each of the letters of a standard alphabet, each letter of sad first subset being employed where the regular pronunciation of a letter is involved, (b) a second subset of letters having a type face heavier than said predetermined type face, the letters of said second subset being employed where the heavier pronunciation of consonants and the longer pronunciation of vowels is involved, (c) a third subset of letters in dotted type face, the letters of said third subset being employed where unsounded letters are involved, and (d) a fourth subset of letters, each of said letters in said fourth subset having a type face, partially dotted and partially in the type face of one of the other of said subsets, the letters of said fourth subset being employed where the pronunciation of the letter involved may be indicated by means of the undotted portion of the letter, each of the letters in said second, third and fourth subsets having a readily recognizable shape relationship to the corresponding letter in said first subset.

8. The educational text of claim 7 further comprising:

a fifth subset of letters in hollow type, each of the letters of said fifth subset being employed where the hollow vowel sound is involved, each of the letters in said fifth subset having a readily recognizable shape relationship to the corresponding letter in said first subset.

9. The educational text of claim 7 further comprising:

a bar underlining selected ones and selected groups of said letters, said bar being employed where said letters and letter groups have arbitrary pronunciations, and a dot positioned below selected ones of said letters, said dot being employed to indicate the nondescript schwa sound.

10. The educational text of claim 8 further comprising:

a bar underlining selected ones and selected groups of said letters, said bar being employed where said said letters and letters groups have arbitrary pronunciations, and a dot positioned below selected ones of said letters, said dot being employed to indicate the nondescript schwa sound.

11. The method of preparing a printed text for a student to learn to read and spell comprising the steps of:

(a) selecting letters from a first set of letters of a predetermined type face, said first set containing each of the letters of a standard alphabet, each letter of said first set being employed where the regular pronunciation of a letter is involved, (b) selecting letters from a second set of letters having a type face heavier than said predetermined type face, the letters of said second set being employed where the heavier pronunciation of consonants and the longer pronunciation of vowels is involved, (c) selecting letters from a third set of letters having a dotted type face, the letters of said third set being employed where unsounded letters are involved, and (d) selecting letters, from a fourth set of letters having a type face, partially dotted and partially in the type face of one of the other of said sets, the letters of said fourth set being employed where the pronunciation of the letter involved may be indicated by means of the undotted portion of the letter, each of the letters selected during each of said selecting steps having a readily recognizable shape relationship to the corresponding letter having said predetermined type face.

12. The method of preparing a printed text of claim 11 further comprising the step of selecting letters from a fifth set of letters having a hollow type face, each of the letters of said fifth set being employed where the hollow vowel sound is involved, each of the letters in said fifth set having a readily recognizable shape relationship to the corresponding letter in said first set.

13. The method of preparing a printed text of claim 11 further comprising the steps of:

placing a bar underneath selected individual letters and groups of letters, said bar being employed where said letters and letter groups have arbitrary pronunciations, and placing a dot below selected ones of said letters, said dot being employed to indicate the nondescript schwa sound.

14. The method of preparing a printed text of claim 12 further comprising the steps of:

placing a bar underneath selected individual letters and groups of letters, said bar being employed where said letters and letter groups have arbitrary pronunciations, and placing a dot below selected ones of said letters, said dot being employed to indicate the nondescript schwa sound.

15. The method of learning reading and spelling by studying a printed text having the material to be read and learned duplicated on facing pages, a first one of said facing pages having said material printed in a predetermine type face, the second one of said facing pages having said material printed in a type face employing the letters of claim 7, said method comprising the steps of:

reading the text employing the predetermined type face until a portion of said text is reached whose pronunciation is not understood, and reading the corresponding portion of the text in the type face of claim 7 to obtain an understanding of the pronunciation of the corresponding text material in said predetermined type face.

References Cited

UNITED STATES PATENTS

| | | | |
|---|---|---|---|
| 78,296 | 5/1868 | Leigh | 283—46 |
| 146,631 | 1/1874 | Allen | 283—46 |

WILLIAM H. GRIEB, *Primary Examiner.*

U.S. Cl. X.R.

101—399; 283—46